(12) United States Patent
Schwanemann et al.

(10) Patent No.: US 12,021,433 B2
(45) Date of Patent: Jun. 25, 2024

(54) ELECTRIC MOTOR

(71) Applicant: Schaeffler Technologies AG & Co. KG, Herzogenaurach (DE)

(72) Inventors: Peter Schwanemann, Bühl (DE); Andreas Keskinoglu, Strasbourg (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 800 days.

(21) Appl. No.: 17/047,221

(22) PCT Filed: Apr. 23, 2019

(86) PCT No.: PCT/DE2019/100375
§ 371 (c)(1),
(2) Date: Oct. 13, 2020

(87) PCT Pub. No.: WO2019/206380
PCT Pub. Date: Oct. 31, 2019

(65) Prior Publication Data
US 2021/0143704 A1    May 13, 2021

(30) Foreign Application Priority Data

Apr. 27, 2018 (DE) .......................... 102018110176.7

(51) Int. Cl.
| H02K 5/06 | (2006.01) |
| H02K 5/15 | (2006.01) |
| H02K 5/20 | (2006.01) |
| H02K 15/02 | (2006.01) |
| H02K 15/14 | (2006.01) |

(52) U.S. Cl.
CPC ................. *H02K 5/06* (2013.01); *H02K 5/15* (2013.01); *H02K 5/203* (2021.01); *H02K 15/02* (2013.01); *H02K 15/14* (2013.01); *Y10T 29/49009* (2015.01)

(58) Field of Classification Search
CPC    H02K 5/06; H02K 5/02; H02K 5/203; H02K 5/04; H02K 1/16; H02K 9/00; Y10T 29/49012; Y10T 29/49009
USPC .................................. 29/596, 598, 606, 609
See application file for complete search history.

(56) References Cited

U.S. PATENT DOCUMENTS 1,711,414 A  *  4/1929  Kanaky .............. B22D 19/0054
                                                    164/109

FOREIGN PATENT DOCUMENTS

| CN | 104836395 A |  | 8/2015 |  |
| DE | 767429 C |  | 7/1952 |  |
| DE | 19851439 A1 |  | 3/2000 |  |
| DE | 102005002897 A1 |  | 11/2005 |  |
| DE | 102009000591 A1 |  | 8/2010 |  |
| DE | 102011007690 A1 |  | 3/2012 |  |
| DE | 102011076904 A1 |  | 12/2012 |  |
| DE | 102011082461 A1 |  | 12/2012 |  |
| DE | 102012213237 | * | 1/2014 | ............... H02K 5/20 |

(Continued)

*Primary Examiner* — Thiem D Phan (57) ABSTRACT

An electric motor comprises a cylindrical housing, a stator comprising multiple stacked metal sheets and mounted in the housing, and a rotor which sits on a shaft, which is rotatably mounted in a respective bearing shield provided at a first end or at a second end of the housing. The housing is die cast. The stator protrudes into a wall of the housing with a depth. The depth is smaller than a thickness of the wall. A method for producing such an electric motor is also disclosed.

5 Claims, 5 Drawing Sheets

(56) References Cited

FOREIGN PATENT DOCUMENTS

| | | |
|---|---|---|
| DE | 102012213237 A1 | 1/2014 |
| DE | 102015200096 A1 | 12/2015 |
| EP | 2933902 A1 | 10/2015 |
| GB | 2233836 A | 1/1991 |

* cited by examiner

Fig. 12

ELECTRIC MOTOR

CROSS-REFERENCE TO RELATED APPLICATIONS

This application is the U.S. National Phase of PCT Appln. No. PCT/DE2019/100375 filed Apr. 23, 2019, which claims priority to DE 10 2018 110 176.7 filed Apr. 27, 2018, the entire disclosures of which are incorporated by reference herein.

TECHNICAL FIELD

The present disclosure relates to an electric motor. The disclosure relates in particular to an electric motor having a cylindrical housing, a stator, which consists of multiple stacked metal sheets and which is mounted in the housing, and having a rotor that sits on a shaft, which is rotatably mounted in a respective bearing shield that is provided at a first end or at a second end of the housing.

The disclosure further relates to a method for producing such an electric motor.

BACKGROUND

Various housing production and assembly concepts for electric motors are known and are already being used in mass production.

The German patent application DE10 2011 076 904 A1 discloses a cooled stator for an electric motor.

The German patent application DE 10 2011 082 461 A1 discloses a stator housing for an electric motor.

The European patent application EP 2 933 902 A1 discloses a heat dissipation of an electrical machine.

The German patent application DE 10 2015 200 096 A1 discloses a cooling jacket arrangement for an electric motor.

The German patent application DE 198 51 439 A1 discloses an electrical machine with a stator and a die-cast housing. Cooling channels are integrated in the stator.

The German patent application DE 10 2009 000 591 A1 discloses a drive device, preferably a hybrid drive device, in particular for a motor vehicle. An internal combustion engine is provided for driving the motor vehicle. An electrical machine with a stator and a rotor is arranged in a housing. The housing is provided with at least one cooling rib to improve the cooling of the electrical machine.

The German patent application DE 10 2012 213 237 A1 discloses an electrical machine with a housing, a stator and a rotor. A cooling channel is provided between the housing and the stator. The housing and the stator are form-fit connected to one another via axial webs against a radial rotation, the webs being designed to divert the cooling medium.

The construction of a housing from three components is known from the prior art. The first component is what is termed an A-bearing shield, the second component is a cylindrical central housing part as an extruded profile, and the third component is also a bearing shield, what is termed a B-bearing shield. The A-bearing shield is on the output side and usually has a fixed bearing. The B-bearing shield is arranged on the axially opposite side and the bearing is effected, for example, without limitation, via a sliding seat to be able to compensate for thermal expansion of the rotor armature. In electric machines, bearing shields are usually the rear and front covers of the housing, which protect the inside of the machine against contact and accommodate the bearings of the shaft ends of the rotor armature. The disadvantage of this three-part construction of the housing is that the stator only adjoins the cylindrical central housing part from the outside or the stator and housing are only arranged to be adjacent to one another (see FIG. 1). This arrangement of stator and housing causes a relatively poor security against rotation and stability. To achieve better stability, the housing from three components must be made larger, as explained below. To be able to ensure the security against rotation with this arrangement of stator and housing, a high contact pressure (for example by means of a shrink fit, press fit, or the like) is required. To ensure the housing stability with this contact pressure and the associated mechanical stresses, the thickness of the housing must therefore be made relatively large, making the housing heavier and more expensive to manufacture, which in turn contradicts today's requirements for compactness and price sensitivity. In addition, there is a relatively poor thermal transition between the stator and the housing.

SUMMARY

The object of the invention is therefore to create an electric motor that is compact, inexpensive and simple to manufacture and assemble, and also safe to operate.

This object is achieved by an electric motor according to embodiments disclosed herein. The claims contain advantageous embodiments of the electric motor.

The object of the invention is also to create a method for producing an electric motor which produces a compact electric motor inexpensively and in a simple manner, the electric motor being easy to install and also being safe to operate.

This object is achieved by a method for producing an electric motor according to embodiments disclosed herein. The claims contain advantageous embodiments of the method.

In one embodiment, the electric motor according to the invention comprises a cylindrical housing, a stator and a rotor. The stator comprises multiple stacked metal sheets or comprises multiple stacked metal sheets, and the stator is mounted in the housing. The rotor sits on a shaft. The shaft is, for example, rotatably mounted in a respective bearing shield which closes the housing. The respective bearing shield is provided at a first end or at a second end of the housing. According to the invention, at least the housing (housing jacket) is die cast. In addition, according to the invention, the stator projects seamlessly into a wall of the housing with a depth, the depth being smaller than a thickness of the wall. The housing therefore lies directly, seamlessly, and firmly on the stator and even encloses the stator to the specified depth, which has several advantages. First, the so-constructed electric motor is compact. Secondly, the stator is anchored securely and firmly, in particular also non-twisting, on or even partially in the housing, so that the electric motor is safe in operation. Thirdly, a very good heat transfer resistance is achieved as a result. Fourth, die casting is an inexpensive manufacturing process. Fifth, the assembly of the electric motor itself and in the environment thereof is simple.

In one embodiment of the electric motor according to the invention, the housing is die cast from aluminum, which also has a cost-effective effect on the production of the electric motor and also reduces the weight of the electric motor.

In one embodiment of the electric motor according to the invention, at least some of the stacked metal sheets of the stator have multiple teeth on an outer circumference which protrude into the wall of the die-cast housing. This also has several advantages. The teeth ensure an even better anchoring of the laminated stator core in the housing, the weight of the electric motor is thereby further reduced and, in the case of small installation spaces, installation space for cooling channels for a cooling medium can be made available in the housing. The recesses for the cooling channels can, for example, be expediently but not necessarily, formed below the stator teeth in the wall of the housing. The shape of the teeth on the outer circumference should be selected so that there is adequate anchoring, for example, but without limiting the invention, as a hook with at least one barb, but also as more simply shaped rectangles, trapezoids, or triangles, possibly with rounded corners, as for example with a toothing on known gears.

In one embodiment of the electric motor according to the invention, multiple channels for a cooling medium is formed in the wall of the housing. The cooling medium can for example be a mixture of water and glycol. The channels serve to effectively dissipate heat loss from the electric motor and, in one embodiment, can be formed directly in the die casting. In further embodiments, the channels are shaped in an axial direction and, analogously to housings, are connected with an extruded profile component via the two bearing shields.

In one embodiment of the electric motor according to the invention, the cylindrical housing is materially connected to a bearing shield at the first end or at the second end of the housing. The die-cast housing is then cast, for example, in a "pot shape," which means that a first bearing shield is cast directly onto the stator-bearing housing part and is firmly connected thereto and only an additional, i.e., a second, bearing shield is installed on the housing. The implementation of integrated cooling channels is also conceivable here. The pot shape also enables the production of a combined housing which, for example, has already formed structures on the housing for the attachment of a gearbox.

In one embodiment of the electric motor according to the invention, multiple channels are formed in the bearing shield, which are fluidly connected to the channels in the wall of the housing for the circulation of the cooling medium. These channels in the bearing shield also serve to effectively dissipate heat loss from the electric motor.

The method according to the invention for producing an electric motor comprises several steps. First, the electric motor in turn comprises a cylindrical housing, a stator, which comprises multiple stacked metal sheets or comprises multiple stacked metal sheets, the stator being mounted in the housing, and a rotor that sits on a shaft and is rotatably mounted in a respective bearing shield that is attached to is provided at a first end or at a second end of the housing. In a first step, the stator, which is made from multiple stacked metal sheets, is inserted into a die-casting mold in such a way that the stator partially protrudes into a clearance in the die-casting mold. In a next step, the clearance of the die-casting mold is injected with a material that conducts heat well so that the thermally conductive material rests seamlessly on the part of the stator protruding into the clearance and forms the housing that holds the stator. The advantages of the method according to the invention have already been described herein in connection with the electric motor.

In one embodiment of the method, the stator winding with insulation is introduced in a later manufacturing step after the clearance of the die-casting mold has been injected with a material that conducts heat well.

In one embodiment of the method according to the invention, in the case of the stator inserted into the die-casting mold, multiple teeth are formed on some of the stacked metal sheets of the stator on an outer circumference. The teeth are encapsulated by the material when the die-casting mold is injected, so that the teeth protrude into a wall of the die-cast housing. Possible shapes and the advantages of the teeth have already been described herein in connection with the electric motor.

In one embodiment of the method according to the invention, multiple channels for a cooling medium are formed in the wall of the housing during injection into the clearance of the die-casting mold. The advantages of the channels have already been described herein in connection with the electric motor.

In one embodiment of the method according to the invention, a bearing shield is placed on the first end or the second end of the housing in such a way that the multiple channels of the housing fluidly communicate with multiple channels in the respective bearing shield for circulation of the cooling medium. The advantages of the bearing shields and channels have already been described herein in connection with the electric motor.

In one embodiment of the method according to the invention, the die-casting mold is designed in such a way that, in addition to the housing, a bearing shield is formed at the first end or the second end of the housing in such a way that the bearing shield is integrally connected to the housing and the multiple channels formed in the bearing shield with the channels in the wall of the housing are fluidly connected to the circulation of the cooling medium. The advantages have also already been described herein in connection with the electric motor.

Without limiting the invention, the invention is used, for example, in all devices in which rotating electrical machines are installed. In particular, but not exclusively, the invention can be used in the field of electric drive systems for electric-axle and hybrid systems.

BRIEF DESCRIPTION OF THE DRAWINGS

The various embodiments of the present disclosure and the advantages thereof are explained in more detail below with reference to the accompanying drawings.

The drawings represent only specific exemplary embodiments of the invention. However, the invention is expressly not intended to be restricted to the exemplary embodiments shown.

DETAILED DESCRIPTION

Figure 1:
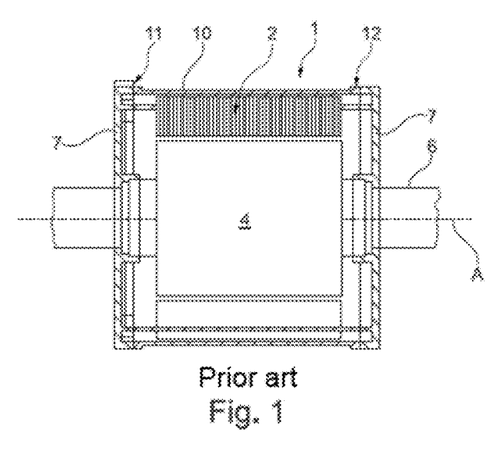
FIG. 1 shows a sectional view of an electric motor of the prior art.

FIG. 1 shows a sectional view of an electric motor 1 from the prior art. The electric motor 1 comprises a cylindrical housing 10, a stator 2, and a rotor 4. The stator 2 comprises multiple stacked metal sheets 3 (see the metal sheets 3 in detail in FIG. 2) and is mounted in the housing 10. The rotor 4 sits on a shaft 6, through the center of which runs the axis A (axis of rotation) of the electric motor 1. In one embodiment, and as shown in FIG. 1, the shaft 6 is rotatably mounted in a bearing shield 7. A first bearing shield 7 is provided at a first end 11 of the housing 10 and a second bearing shield 7 is provided at a second end 12 of the housing 10. The respective bearing shield 7 represents a cover and closes the housing 10, as already described in detail in the introduction. As shown in FIG. 1, a certain distance is usually provided in the prior art between the stator 2 and the housing 10, so that the stator 2 is not directly connected to the housing 10, or the stator 2 is only adjacent to the outside cylindrical central housing part or stator 2 and housing 10 are only arranged to be adjacent to one another. As already described in the introduction, the disadvantage of this construction is that the electric motor 1 constructed in this way is not compact and is therefore expensive to manufacture, the stator 2 might not be anchored securely and firmly, in particular not be secured against rotation, on the housing 10, so that the electric motor 1 might not be safe to operate, and there is also a relatively poor thermal transition between the stator 2 and the housing 10.

Figure 2:
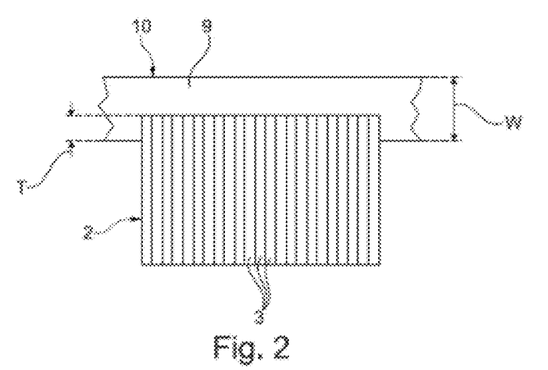
FIG. 2 shows an enlarged partial view of an embodiment of the method of fastening the stator according to the invention in the housing of an embodiment of the electric motor according to the invention.

FIG. 2 shows an enlarged partial view of an embodiment of the type of fastening according to the invention of the stator 2 in the housing 10 of an embodiment of the electric motor 1 according to the invention. Here, too, the electric motor 1 according to the invention comprises a cylindrical housing 10, a stator 2, and a rotor 4. The stator 2 comprises multiple stacked metal sheets 3 and is mounted in the housing 10. The rotor 4 sits on a shaft 6, through the center of which runs the axis A (axis of rotation) of the electric motor 1. In one embodiment, and as shown in FIG. 1, the shaft 6 is rotatably mounted in a bearing shield 7. A first bearing shield 7 is provided at a first end 11 of the housing 10 and a second bearing shield 7 is provided at a second end 12 of the housing 10. The respective bearing shield 7 closes off the housing 10.

According to the invention and in contrast to FIG. 1, however, in FIG. 2 the housing 10 is die cast and the stator 2 protrudes seamlessly into a wall 9 of the housing 10 with a depth T. The depth T is smaller than a thickness W of the wall 9. The stator 2 is thus surrounded radially by the molded-on die-cast housing 10 and the housing 10 carries the stator 2. As already explained above, the stator 2 then rests directly, seamlessly, and firmly on and even at least partially in the housing 10, which has several advantages. The electric motor 1 constructed in this way is compact and therefore inexpensive to manufacture; the stator 2 is anchored securely and firmly, in particular also secured against rotation, on or in the housing 10 so that the electric motor 1 is securely in operation; a very good heat transfer resistance is achieved; die casting is an inexpensive manufacturing process; and the assembly of the electric motor 1 itself and in the surroundings thereof is simple.

In one embodiment of the electric motor 1 according to the invention, the housing 10 is die cast from aluminum, which also has a cost-effective effect on the manufacture and weight of the electric motor 1.

Figure 3:
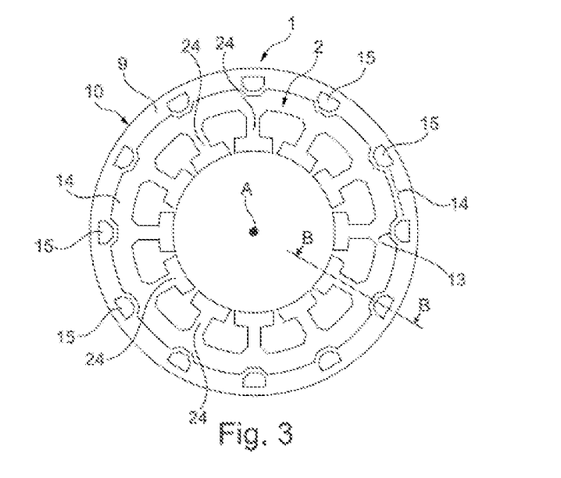
FIG. 3 shows a sectional view through the housing and the stator along a sectional plane A-A perpendicular to the axis of an embodiment of the electric motor.
Figure 4:
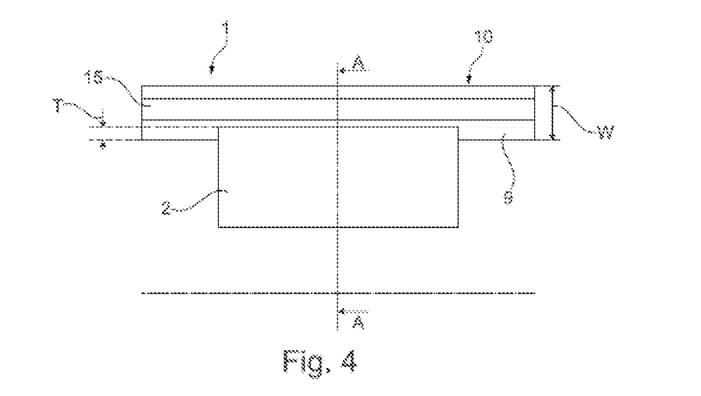
FIG. 4 shows a sectional view through the housing and the stator along a sectional plane B-B running radially to the axis of the electric motor according to FIG. 3.

FIG. 3 shows a sectional view through the housing 10 and the stator 2 along a sectional plane A-A according to FIG. 4 perpendicular to the axis A of an embodiment of the electric motor 1, the sectional plane A-A lying within the area of the stator 2. Axis A is drawn in here as a point, since axis A effectively comes out of the plane in this sectional view.

In the embodiment of the electric motor 1 according to the invention shown in FIG. 3, multiple channels 15 for a cooling medium are formed in the wall 9 of the housing 10. The cooling medium can for example be a mixture of water and glycol. The channels 15 serve to effectively dissipate heat loss from the electric motor 1 and, in one embodiment, can be formed directly in the die casting. In the illustration according to FIG. 3, the recesses for the cooling channels 15 are expediently but not necessarily, formed below the stator teeth 24 in the wall 9 of the housing 10. The other components of the electric motor 1 are described in connection with FIG. 2.

In the embodiment of the electric motor 1 according to the invention shown in FIG. 3, at least some of the stacked metal sheets 3 of the stator 2 have multiple teeth 14 formed on the outer circumference 13, which protrude into the wall 9 of the die-cast housing 10. Without limiting the invention, the shape of the teeth 14 on the outer circumference should be selected so that there is adequate anchoring, for example, as relatively complex hooks with two barbs each, but also as simply shaped rectangles, trapezoids or triangles, such as a toothing on known gears. Without limiting the invention, the teeth 14 in the illustration according to FIG. 3 are shaped, for example, as elongated, rounded trapezoids.

FIG. 4 shows a sectional view through the housing 10 and the stator 2 along a sectional plane B-B according to FIG. 3 running radially to the axis A of the electric motor 1 according to FIG. 3. In the embodiment shown, the channels 15 are formed in an axial direction, that is, parallel to the axis A, and are connected to housings with an extruded profile component via the two bearing shields 7 (see, for example, FIG. 7). It can be clearly seen that the stator 2 of the die-cast housing 10 projects seamlessly into a wall 9 of the housing 10 with a depth T, and the depth T is less than a thickness W of the wall 9. The stator 2 is thus surrounded radially by the molded-on die-cast housing 10 and the housing 10 carries the stator 2. As already explained above, the stator 2 rests directly, seamlessly, and firmly on or even partially in the housing 10. The other components of the electric motor 1 are described in connection with FIGS. 2 and 3.

Figure 5:
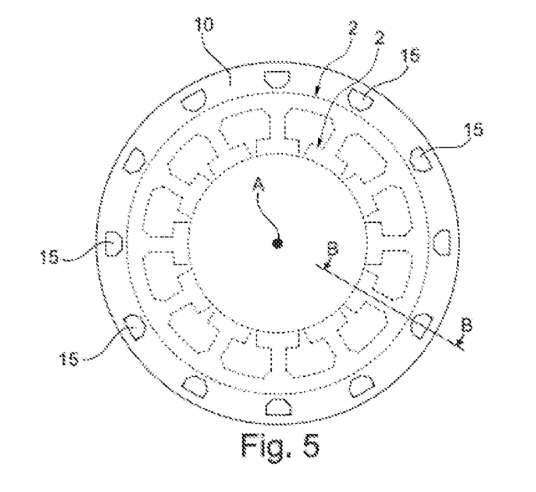
FIG. 5 shows a sectional view through the housing along another sectional plane A-A which is perpendicular to the axis of the electric motor according to FIG. 3 and which lies outside the region of the stator.
Figure 6:
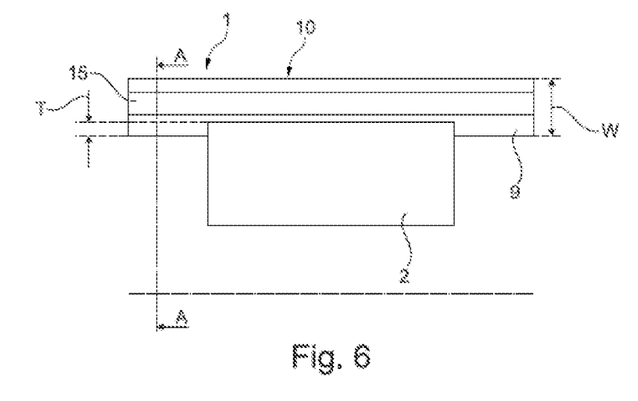
FIG. 6 shows a sectional view through the housing and the stator along another sectional plane B-B running radially to the axis of the electric motor according to FIG. 3.

FIG. 5 shows a sectional view through the housing 10 along a sectional plane A-A according to FIG. 6, which is different compared to FIG. 3 is also perpendicular to the axis A of the electric motor 1 according to FIG. 3, wherein the sectional plane A-A (in contrast to FIGS. 3 and 4) is outside the range of the stator 2. Correspondingly, the stator 2 is shown only schematically (dashed lines) in FIG. 5. The other components of the electric motor 1 are described in connection with FIGS. 2 to 4.

FIG. 6 shows a sectional view through the housing 10 and the stator 2 along a sectional plane B-B according to FIG. 5, which is different compared to FIG. 4 and also extends radially to the axis A of the electric motor 1 according to FIG. 3. The other components of the electric motor 1 are described in connection with FIGS. 2 to 5. It can again be clearly seen that the stator 2 protrudes into the housing 10 with a depth T which is significantly smaller than the wall thickness W of the wall 9 of the housing 10.

Figure 7:
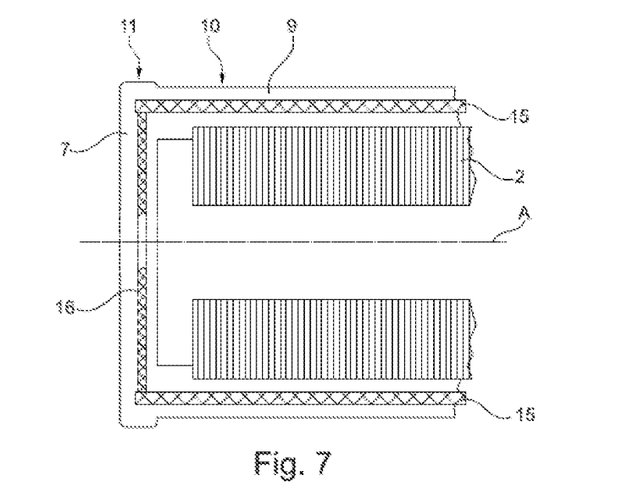
FIG. 7 shows a partial view of an embodiment according to the invention in which a bearing shield is an integral part of the housing.

FIG. 7 shows a partial view of an embodiment of the electric motor 1 according to the invention, in which a bearing shield 7 is an integral part of the housing 10.

The cylindrical housing 10 is materially connected to a bearing shield 7 at the first end 11 and/or at the second end 12 of the housing 10, wherein, without limiting the invention, only the bearing shield 7 at the first end 11 is shown here. The other bearing shield 7 (not shown in FIG. 7) is installed on the housing 10 to be axially symmetrical with respect to a perpendicular of the axis A to the first bearing shield 7, and the two bearing shields 7 then each form a cover for the housing 10. The structure of the housing 10 according to FIG. 7 is thus made up of three parts: A-bearing shield, cylindrical middle housing part as an extruded profile, and B-bearing shield.

The die-casting produced housing 10 is cast, for example, in a "pot shape," which means that the first bearing shield 7 is cast directly onto the part of the housing 10 carrying the stator 2 and only one additional, i.e., the second, bearing shield 7 is necessary (not shown in FIG. 7), which must be installed on the housing 10. The implementation of integrated cooling channels 16 in the respective bearing shield 7 is also conceivable here, as also shown in FIG. 7.

In the embodiment shown in FIG. 7, the multiple channels 16 formed in the bearing shield 7 die cast with the housing 10 are fluidly connected to the channels 15 in the wall 9 of the housing 10 for the circulation of the cooling medium. These channels 16 in the cast-on bearing shield 7 also serve to effectively dissipate heat loss from the electric motor 1. The other bearing shield, not shown, can also be provided with cooling channels.

Figure 8:
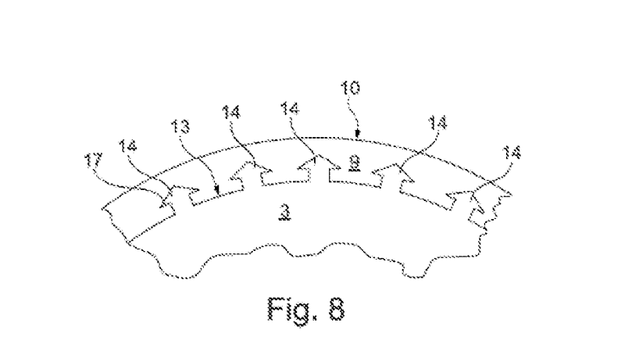
FIG. 8 shows a plan view of part of a metal sheet for a sheet metal stack of the stator.

FIG. 8 shows a plan view of part of a metal sheet 3 for a metal sheet stack of the stator 2. As with FIG. 3, in the embodiment of the electric motor 1 according to the invention according to FIG. 8, at least some of the stacked metal sheets 3 of the stator 2 have multiple teeth 14 formed on an outer circumference 13 of the respective sheet 3, which also protrude into the wall 9 of the die-cast housing 10. This also has several advantages, as already explained above. The teeth 14 ensure an even better anchoring of the laminated stator core in the housing 10, the weight of the electric motor 1 is thereby further reduced and, in the case of small installation spaces, installation space for cooling channels 15 (see FIGS. 3 to 7) for a cooling medium in the housing 10 can be made available. The shape of the teeth on the outer circumference 13 should be selected so that there is sufficient anchoring, for example and as shown in FIG. 8, but without limiting the invention, as a hook with at least one barb 17, here with two barbs 17 per tooth 14 are shown. However, the hook shape of the teeth 14 selected in FIG. 8 is complex and therefore expensive to manufacture. As already described above, other, simpler shapes for the teeth can also be selected instead, for example, without limiting the invention, rectangles, trapezoids (see FIG. 3) or triangles, if necessary with rounded corners, such as for a toothing on known gears.

The recesses for the cooling channels 15 can, for example, expediently but not necessarily, be formed below the stator teeth 24 (see FIG. 3) in the wall 9 of the housing 10.

Figure 9:
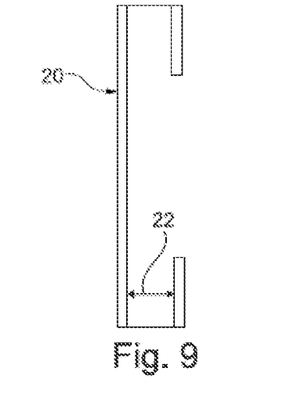
FIG. 9 shows a schematic partial view of an embodiment of a die-casting mold for producing at least one housing.
Figure 10:
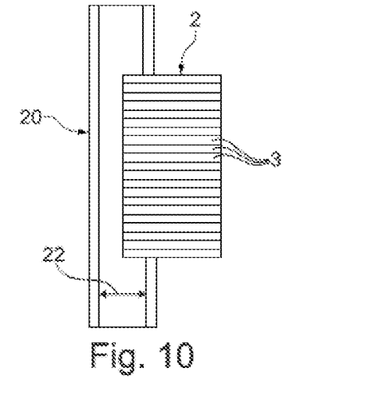
FIG. 10 shows a schematic partial view of a stator inserted in the die-casting mold.
Figure 11:
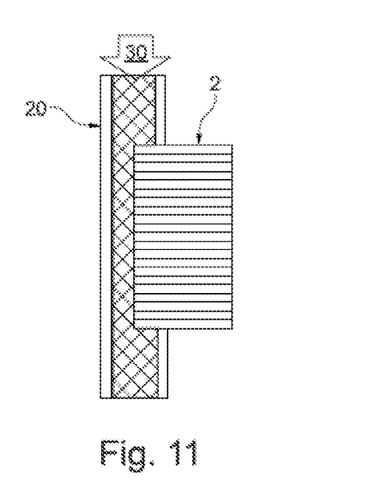
FIG. 11 shows a schematic partial view of a material injected into the die-casting mold.
Figure 12:
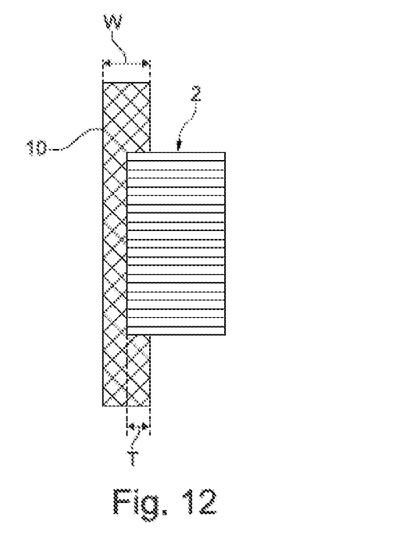
FIG. 12 shows a schematic partial view of the housing with the stator removed from the die-casting mold.

FIG. 9 shows a schematic partial view of an embodiment of a die-casting mold 20 for producing at least one housing 10 for the electric motor 1 according to the invention. As shown in the schematic partial view of FIG. 10, according to the method according to the invention for producing the electric motor 1, the stator 2 from multiple stacked metal sheets 3 is first introduced into the die-casting mold 20 in such a way that the stator 2 partially protrudes in a clearance 22 of the die-casting mold 20. As shown in the schematic partial view of FIG. 11, the clearance 22 of the die-casting mold 20 is then injected with a highly thermally conductive material 30 so that the thermally conductive material 30 rests seamlessly on the part of the stator 2 protruding into the clearance 22 and forms the die-cast housing 10 which holds the stator 2. The die-casting mold 20 can then be removed from the housing 10. The schematic partial view of FIG. 12 shows the housing 10 with the stator 2 removed from the die-casting mold 20. The stator 2 projects seamlessly into a wall 9 of the housing 10 with a depth T. The depth T is smaller than a thickness W of the wall 9. The stator 2 is thus surrounded radially by the molded and die-cast housing 10 and the housing 10 carries the stator 2. The advantages of the method according to the invention have already been described in connection with the electric motor 1 according to the invention.

In one embodiment of the method, the winding of the stator 2 with insulation is introduced in a later production step after injection into the clearance 22 of the die-casting mold 20 of a material 30 that is a good conductor of heat (see FIG. 11).

In one embodiment of the method according to the invention, multiple teeth 14 are formed on some of the stacked metal sheets 3 of the stator 2 on an outer circumference 13 of the stator 2 inserted in the die-casting mold (not shown in FIGS. 9 to 12, see instead FIG. 8). The teeth 14 are encapsulated by the material 30 when injected into the die-casting mold 20 according to FIG. 11 so that the teeth 14 protrude into the wall 9 of the die-cast housing 10. The advantages of the teeth 14 have already been described in connection with FIGS. 3 and 8.

In one embodiment of the method according to the invention, multiple channels 15 for a cooling medium are formed in the wall 9 of the housing 10 during injection into the clearance 22 of the die-casting mold 20 (according to FIG. 11) (not shown in FIGS. 9 to 12, see instead FIGS. 3 to 7). The advantages of the channels 15 have already been described above.

In one embodiment of the method according to the invention, a bearing shield 7 is placed on the first end 11 or the second end 12 of the housing 10 in such a way that the multiple channels 15 of the housing 10 fluidly communicate with multiple channels 16 in the respective bearing shield 7 for the circulation of the cooling medium (not shown in FIGS. 9 to 12, see instead FIG. 7). The advantages of the bearing shields 7 and channels 15, 16 have already been described above.

In one embodiment of the method according to the invention, the die-casting mold 20 is designed in such a way that, in addition to the housing 10, a bearing shield 7 is formed at the first end 11 or second end 12 of the housing 10 in such a way that the bearing shield 7 is firmly connected to the housing 10 and the multiple channels 16 formed from the bearing shield 7 are fluidly connected to the channels 15 in the wall 9 of the housing 10 for the circulation of the cooling medium, but this is also not shown in FIGS. 9 to 12, see instead FIG. 7). The advantages are also already described above.

LIST OF REFERENCE NUMBERS

1 Electrical motor
2 Stator

3 Metal sheet
4 Rotor
6 Shaft
7 Bearing shield
9 Wall
10 Housing
11 First end
12 Second end
13 Outer circumference
14 Tooth
15 Channel
16 Channel
17 Barbs
20 Die-casting mold
22 Clearance
24 Stator tooth
30 Material
A Axle
A-A Sectional plane
B-B Sectional plane
T Depth
W Wall thickness

The invention claimed is:

1. An electric motor comprising
a cylindrical housing,
a stator comprising multiple stacked metal sheets and mounted in the housing,
a rotor seated on a shaft rotatably mounted in a respective bearing shield provided at a first end or at a second end of the housing,
wherein housing is die cast and the stator projects into a wall of the housing with a depth, wherein the depth is smaller than a thickness of the wall,
wherein multiple channels for a cooling medium are formed in the wall of the housing;
wherein the housing is materially connected to a bearing shield at the first end or at the second end of the housing, and
wherein multiple channels are formed in the bearing shield, which are fluidly connected to the channels in the wall of the housing for a circulation of the cooling medium.

2. The electric motor according to claim 1, wherein at least one of the stacked metal sheets of the stator have multiple teeth formed on an outer circumference which protrude into the wall of the housing.

3. The electric motor according to claim 2, wherein the teeth include a hook with at least one barb.

4. The electric motor according to claim 2, wherein the teeth have a shape that is at least one of a rectangle, a trapezoid, and a triangle.

5. The electric motor according to claim 1, wherein the housing is die cast from aluminum.

* * * * *